United States Patent [19]
Wolvers et al.

[11] 3,909,498
[45] Sept. 30, 1975

[54] PROCESS FOR PREPARING GRANULAR POWDERED POLYAMIDE

[75] Inventors: Wilhelmus P. Wolvers, Sittard; Jean M. M. Warnier, Urmond, both of Netherlands

[73] Assignee: Stamicarbon B.V., Geleen, Netherlands

[22] Filed: July 13, 1973

[21] Appl. No.: 378,938

[52] U.S. Cl. ............................................. 260/78 L
[51] Int. Cl.² ........................................ C08G 69/18
[58] Field of Search ............ 260/78 L, 78 P, 31.2 N

[56] References Cited
UNITED STATES PATENTS

| | | | |
|---|---|---|---|
| 2,281,961 | 5/1942 | Ufer et al. | 260/78 L |
| 2,857,364 | 10/1958 | Berthold et al. | 260/78 L |
| 3,308,099 | 3/1967 | Mermound et al. | 260/78 L |
| 3,366,608 | 1/1968 | Lincoln et al. | 260/78 L |
| 3,470,139 | 9/1969 | Marshall et al. | 260/78 L |
| 3,673,161 | 6/1972 | Sebenda et al. | 260/78 L |
| 3,704,280 | 11/1972 | van der Loos et al. | 260/78 L X |
| 3,772,253 | 11/1973 | Brassat | 260/78 L |

*Primary Examiner*—Lucille M. Phynes
*Attorney, Agent, or Firm*—Cushman, Darby & Cushman

[57] ABSTRACT

A process for the preparation of polyamides in granular or powdered form is described, said process comprising heating a lactam or mixture of lactams in a suitable inert solvent at a temperature below the melting point of the polyamide to be formed, in the presence of a conventional anionic catalyst and a conventional promotor. The disclosure points out that the presence during polymerisation of one or more compounds from the group of alcohols, carboxylic esters and inert salts, dissolved or dispersed in the solvent, prevents the formation of lumps and the adhesion of the polyamide to the reactor walls.

5 Claims, No Drawings

PROCESS FOR PREPARING GRANULAR POWDERED POLYAMIDE

The invention relates to a process for preparing granular or powdered polyamide by polymerization of a lactam or a mixture of lactams in an inert solvent by means of an anionic catalyst and a promoter at a temperature below the melting point of the polyamide to be formed.

Such a polyamide in the form of particles can well be processed into fibres, film, threads, layers of covering, and shaped articles. The above method is the only way to prepare a granular or powdered polyamide in one step. A polyamide melt is obtained by hydrolytic polymerization, and, in dependence on the polymerization temperature, a melt or a solid polyamide block is obtained by anionic polymerization in the mass.

In practice, however, this anionic polymerization in a solvent at a temperature below the melting point of the polyamide to be formed appears to be difficult to effect with good and reproducible results. Experiments with various catalysts, promoters and solvents have shown that the particle size, the degree of polymerization and the polymerization rate are difficult to control, while the yield is low and, in many cases, the polyamide formed clots and adheres to the reactor wall and the stirrer and is difficult to separate from the solvent.

To overcome these difficulties, it has already been proposed to add the catalyst and/or promoter to the dissolved monomers in small portions and at different times (see Netherlands Pat. Application No. 6,705,888), or to carry out the polymerization in the presence of polymeric dispersing agents of high molecular weight (see U.S. Pat. No. 3,298,977), or to use a distributing agent of a specific gravity which ranges just between the specific gravities of the lactam monomer and of the polyamide to be formed (see U.S. Pat. No. 3,451,976).

According to the invention, a powdered or granular polyamide can be prepared by polymerizing a lactam or a mixture of lactams in an inert solvent by means of an anionic catalyst and a promoter at a temperature below the melting point of the polyamide, while one or more modifiers from the group of alcohols, carboxylic esters, and inert salts have moreover been dissolved or distributed in the solvent.

The specific density of the polyamide obtained in this way is high (about 1.17) and the percentage of material that can be extracted with water is low, in most cases less than 2 %. The relative viscosity of these polyamides may range between the usual values for polyamides of 2.0 and 8.0, which corresponds to weight-average molecular weights of between 20,000 and 100,000, but it is also possible to prepare products with a very high molecular weight and a relative viscosity of 20. A striking fact here is that the molecular-weight distribution is rather wide with a high ratio of weight-average molecular weight to number-average molecular weight, unlike the narrow molecular-weight distribution found in polyamides prepared by anionic polymerization in the mass with conventional promoters, e.g. of the N-acyl-lactam type. Presumably, the polymer contains a relatively high percentage of polyamide with a low molecular weight that cannot be extracted with water. As a consequence, the polyamide obtained by the invention can very well be spun and extruded, even though the relative viscosity is high. For instance, the polyamide with a relative viscosity of 4.0 can still be spun well, whereas a polyamide with a relative viscosity of 3.0 prepared by hydrolytic polymerization is more difficult to spin under the same conditions. Another consequence is that the polyamide contains many basic terminal groups in comparison with polyamides of the same relative viscosity prepared in another way, so that the polyamide obtained according to the invention can very well be painted.

The mechanical properties of the polyamide prepared according to the invention and of the articles made thereof are excellent. A very favourable point is that the impact strength at a high rigidity (expressed as E-modulus) is high, whereas in other polyamides an increase of the impact strength is usually obtained at the cost of the rigidity. The creep of extruded products is low, and the bending strength and the yield point are both high.

The amounts of alcohol or ester added as a modifier may vary from 20 to 200 moles %, calculated with respect to the promoter, and preferably range between 25 and 100 moles per cent. If smaller amounts are used, the effect is hardly noticeable; if larger amounts are used, the polymerization is slowed down strongly and a less good product is formed.

The modifier used may be a compound that is volatile at atmospheric pressure and at the prevailing polymerization temperature. If it is desired to add the whole amount of modifier before or at the start of the reaction, the polymerization must then be carried out at elevated pressure. If use is made of a low-boiling modifier, the polymerization may be carried out at ordinary pressure, too, if the modifier is added continuously to the polymerization mixture in order to keep the modifier-concentration constant. If use is made of low-boiling modifiers, such as, e.g., methanol, propanol or ethyl acetate, the solvent used for reaction medium can easily be purified. Higher-boiling modifiers make it possible to carry out the polymerization at atmospheric pressure and with a single addition of modifier. Therefore, the modifier added is preferably a compound that is little volatile at the polymerization temperature and dissolves in the reaction medium. The modifiers are added before or at the start of the polymerisation reaction.

The alcohols that can be used as modifiers are aliphatic and aryl-aliphatic monovalent or polyvalent alcohols. Use is preferably made of monovalent or polyvalent alcohols with 6–30 carbon atoms. Examples of suitable alcohols are hexanol, 2-ethyl butanol, heptanol, octanol, 2-ethyl hexanol, decanol, cetyl alcohol, lauryl alcohol, myristyl alcohol, benzyl alcohol, and phenethanol. Corresponding thiols can also be used as modifiers. Phenols are less suitable as modifiers, since they strongly interfere with the polymerization. Use may also be made of alcohols with a high molecular weight, such as, e.g., polyether polyols and polybutadiene with terminal hydroxyl.

The esters that can be used as modifiers are those esters of aliphatic and aryl-aliphatic alcohols that have been derived from monovalent or polyvalent carboxylic acids. Use in preferably made of esters in which the residual carboxylic acid or the residual alcohol or both contain 5–30 carbon atoms. The carboxylic acid may be aliphatic, aryl-aliphatic or aromatic. The ester may have been derived from carboxylic acids such as acetic acid, butyric acid caproic acid, oenanthic acid, 2- methyl-caproic acid, benzoic acid, caprylic acid, lauric acid, palmitic acid, adipic acid, pimelic acid, suberic acid, phthalic acid, terephthalic acid, and sebacic acid.

Cyclic esters, such as, e.g., caprolactone, may also be used.

Suitable inert salts are inorganic salts, such as sodium chloride, potassium sulphate, magnesium chloride, and carboxylic salts, such as potassium acetate and sodium stearate. The salts may be used in amounts of 0.5–10 % by weight, calculated to the lactam. Use is preferably made of amounts of 2–5 % by weight.

The promoters used may generally be those compounds that are also used in the mass in the anionic polymerization of lactams. A great many promoters have been described, so that a listing may here be omitted.

One promoter, bis-epsilon-caprolactim ether, has been found, which causes the polymerization to proceed well also in the absence of a modifier. If a promoter of this type is uesed, the addition of a modifier mainly affects the molecular weight of the polyamide to be formed. A great many other promoters and especially those of the N-acyl-lactam type, will not lead to the formation of a good powdered or granular polyamide if used in the absence of a modifier. In these cases the addition of a modifier is essential to a proper realization of the polymerization. Here, too, the modifier has moreover some influence on the molecular weight of the polyamide to be formed. Such promoters are cheap and particularly effective, so that those promoters are preferably used in the process according to the invention that highly accelerate the polymerization and which, in the anionic polymerization in the mass, are capable of changing a lactam melt into a solid polyamide mass within 5 minutes at a temperature of 180°C, a promoter concentration of 1,0 mole % and a catalyst concentration of 1,0 mole %. Some examples of such promoters are acyl lactams, such as N-acetyl caprolactam, NN'-adipoyl biscaprolactam, N,N-diacyl-amino compounds, such as N-acetyl benzamide, N,N-diacetyl-methyl amine, and compounds that can react with a lactam to form N-acyl lactams, such as acetyl chloride, adipolyl chloride hexamethylene diisocyanate or toluene diisocyanate.

The promoter may be used in amounts ranging between 0.1 and 3.0 moles %, calculated with respect to the monomeric lactam. The promoter is preferably used in an amount of 0.5–2.0 moles %.

Catalysts that may be used are known compounds from the group of metal lactams and substances that will react with a lactam to form a lactam anion. Some examples are alkali lactams, alkali metal (earth)-alkali oxides, hydroxides, alkoxides, and hydrides, and Grignard compounds. The catalyst may be used in an amount of 0.1–5.0 moles % with respect to the lactam or lactam mixture to be polymerized. In most cases, good results are obtained with 0.5–2.0 moles % of catalyst. The catalyst may be added directly to a solution of the lactam or lactam mixture, but it is also possible first to make the catalyst react with an amount of molten lactam with removal of the resulting volatile by-products and then to add the melt containing lactam anions to the solvent.

The polymerization is carried out with stirring to maintain a homogeneous distribution of the reactants, but the stirring speed is not very critical in the process according to the invention. The usual speed is 200–800 revolutions per minute.

The polymerization temperature has to be below the melting point of the polyamide to be formed and preferably over 100°C if a reasonable polymerization rate is to be obtained. By preference, a temperature between 125° and 170°C is selected. in this temperature range, the polymerization proceeds smoothly with simultaneous crystallization and growth of the polyamide particles formed at the start of the polymerization.

Polymerization media that may be used are inert solvents and mixtures of solvents in which the lactam or mixture of lactams is soluble at the polymerization temperature and in which the resulting polyamide is not or very poorly soluble under the polymerization conditions. Some examples are toluene, xylenes, gasoline with a boiling range of 120°–160°C, tetramethyl pentane, pentamethyl heptane, and tetralin. By preference, solvents with boiling points near or over the polymerization temperature are chosen, so that it is not necessary to use superatmospheric pressure. The pressure is not important for the polymerization to proceed. To avoid disturbance of the polymerization and the formation of coloured product, the process is preferably effected with exclusion of water and oxygen.

Suitable monomers are lactams and mixtures of lactams with at least 6 carbon atoms in the ring. Some examples are caprolactam, oenantholactam, capryl lactam, lauric lactam, substituted lactams, and lactams with an ether or thio-ether bridge in the ring. Particularly the polymerization products from $\epsilon$-caprolactam and lactam mixtures containing $\epsilon$-caprolactam possess good mechnical properties.

After completion of the polymerization, the powdered or granular polyamide formed can readily be separated from the solvent in a known way, for example by filtration, decantation or centrifugal separation, after which residual catalyst may, if so desired, be removed by washing the material with hot or cold water and/or an alcohol or by steaming it. The residual catalyst is very easy to remove, as it is almost exclusively at the surface of the polyamide particles. The polyamide-free solvent may be recirculated, either as such or after purification.

The invention will be elucidated with reference to the following examples concerning the preparation of polyamides according to the invention and the properties of the products thus obtained. However, the invention is not restricted to these embodiments.

EXAMPLE I 200 grams of dry caprolactam were melted in a 1-liter glass reactor at a temperature of 90°C in a nitrogen atmosphere. The catalyst (NaH) was then added and, after the evolution of hydrogen had stopped, 0.4 liter of dry pentamethyl heptane was added. Then the temperature of the solution was raised to the desired value and bis-epsilon-caprolactim ether and octanol-1 were added. After some time the solution turned opaque owing to the formation of small solid polyamide particles. It was found by examining particles taken from the solution at different times under the microscope that the particles grew regularly forming spherulites of regular shape.

After completion of the polymerization, the polyamide was filtered off, washed with water, and dried. The conversion was determined as a percentage of the theoretical yield and the relative viscosity both before and after extraction with water. The relative viscosity was determined in solutions of 1.0 g of polymer in 100 ml of sulphuric acid.

In all cases, use was made of 1.0 mole % of sodium hydride and 2.0 moles % of bis-ε-caprolactim ether, calculated to caprolactam, and the stirring speed was 400 revolutions per minute. For the sake of comparison, an experiment was carried out without addition of octanol, which yielded a useful polymer, which, however, had a rather high relative viscosity. The results are compiled in Table 1.

Table 1

| Experiment | Octanol–1 (mole %) | Reaction time (hours) | Temperature (°C) | Conversion (%) | $\eta_{rel}$ |
|---|---|---|---|---|---|
| 1 | 0.5 | 5 | 160 | 90 | 2.57 |
| 2 | 1.0 | 5 | 160 | 75 | 1.78 |
| 3*) | — | 5 | 160 | 85 | 3.03 |

*) for comparison, not according to the invention.

EXAMPLE II

In the same way as in example I, caprolactam was polymerized with 3 moles % of sodium hydride and 1.0 mole % of N-acetyl-ε-caprolactam at a stirring speed of 400 revolutions per minute. The results are complied in Table 2.

Table 2

| Experiment | Octanol–1 (moles %) | Time (h) | Temperature (°C) | Conversion (%) | $\eta_{rel}$ |
|---|---|---|---|---|---|
| 4 | 2.0 | 4.5 | 160 | 33 | 1.50 |
| 5 | 0.5 | 4.5 | 160 | 65 | 2.15 |
| 6*) | — | 4.5 | 160 | — | — |

*) for comparison, the polymer could not be isolated owing to caking and clotting.

EXAMPLE III

In the same way as in Example I, caprolactam was polymerized with 0.5 mole % of sodium hydride and 0.5 mole % of N-acetyl-ε-caprolactam and with didecyl phthalate as modifier. The temperature was 155°C and the stirring speed 400 revolutions per minute. The results are compiled in Table 3.

Table 3

| Experiment | Didecyl phthalate (millilitres) | Reaction time (hours) | Conversion (%) | $\eta_{rel}$ |
|---|---|---|---|---|
| 7 | 3 | 5 | 94 | 4.51 |
| 8 | 5 | 5 | 89 | 3.75 |
| 9*) | — | 5 | — | — |

*) for comparison, not according to the invention. In this experiment the stirrer got stuck owing to caking and clotting.

EXAMPLE IV

In the same way as in Example I, caprolactam was polymerized with 1.0 mole % of sodium hydride and 1.0 mole % of bis-epsilon-caprolactim ether and with 5 milliliters of didecyl phthalate as modifier. The temperature was 155°C and the stirring speed 400 revolutions per minute. The conversions are given in Table 4 as a function of the polymerization time.

Table 4

| Experiment | Time (minutes) | Conversion (%) |
|---|---|---|
| 10 | 30 | 10 |
| 11 | 60 | 50 |
| 12 | 90 | 80 |
| 13 | 120 | 95 |

EXAMPLE V

In the same way as in Example I, caprolactam was polymerized with 0.5 mole % of sodium hydride and 1.0 mole % of bis-caprolactim ether at 155°C and with didecyl phthalate as modifier. The results are compiled in Table 5.

Table 5

| Experiment | Didecyl phthalate (ml) | Time (hours) | Stirring speed (r.p.m.) | Conversion (%) | $\eta_{rel}$ | Water-soluble fraction |
|---|---|---|---|---|---|---|
| 14 | 1.5 | 2 | 400 | 60 | 3.99 | 1.5 |
| 15 | 1.5 | 5 | 400 | 89 | 4.69 | 2.2 |
| 16 | 3 | 5 | 450 | 90 | 3.75 | 1.9 |
| 17 | 5 | 5 | 400 | 91 | 3.07 | 1.3 |

EXAMPLE VI

In the same way as in Example I, caprolactam was polymerized with 2 moles % of sodium hydride and 2 moles % of biscaprolactim ether at 160°C and a stirring speed of 500 revolutions per minute. 5 grams of dry sodium chloride were added as a modifier. After 1 hour, a finely divided polyamide with a uniform particle size of 0.5 mm was obtained at a conversion of 95 %.

What is claimed is:

1. In a process for preparing a granular or powdered polyamide by the solution polymerization of a lactam or mixture of lactams in an inert solvent by means of an anionic catalyst and a promoter at a temperature below the melting point of the polyamide which is to be formed, the improvement comprising the presence, dissolved or distributed in the solvent, of at least one modifier selected from the group consisting of alcohols containing from 6 – 30 carbon atoms and carboxylic esters derived from aliphatic and aryl-aliphatic alcohols containing 5 – 30 carbon atoms, and a monovalent or polyvalent carboxylic acid containing 5 – 30 carbon atoms, during said polymerization, wherein the amount of modifier is about 20 to about 200 mole per cent, calculated with respect to the amount of promotor.

2. Process according to claim 1, characterized in that the amount of modifier is 25–100 moles %, calculated with respect to the amount of promoter.

3. Process according to claim 1, characterized in that the modifiers used is a monovalent or polyvalent alcohol with 6–30 carbon atoms.

4. Process according to claim 1, characterized in that the modifier used is an ester derived from a monovalent aliphatic alcohol with 6–30 carbon atoms and a monocarboxylic acid with 5–30 carbon atoms.

5. Process according to claim 1, characterized in that the promoter used in a compound that is capable of changing a lactam melt into a solid polyamide within 5 minutes at a temperature of 180°C and a promoter concentration of 1.0 mole %.

* * * * *

UNITED STATES PATENT OFFICE
CERTIFICATE OF CORRECTION

Patent No. 3,909,498        Dated September 30, 1975

Inventor(s) Wolvers et al

It is certified that error appears in the above-identified patent and that said Letters Patent are hereby corrected as shown below:

Column 2, line 62, please correct "in" to --is-- after the word Use.

Column 3, line 43, please correct "adipolyl" to --adipoyl--.

Please insert Claim for Priority:

Netherland Application No. 72 09838, filed July 15, 1972.

Signed and Sealed this third Day of February 1976

[SEAL]

Attest:

RUTH C. MASON
*Attesting Officer*

C. MARSHALL DANN
*Commissioner of Patents and Trademarks*